US011990326B2

(12) United States Patent
Maeda

(10) Patent No.: US 11,990,326 B2
(45) Date of Patent: May 21, 2024

(54) MASS SPECTROMETER WITH CHARGE UP DETERMINER USING ION INTENSITY SIGNAL

(71) Applicant: SHIMADZU CORPORATION, Kyoto (JP)

(72) Inventor: Kazuma Maeda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 512 days.

(21) Appl. No.: 17/028,363

(22) Filed: Sep. 22, 2020

(65) Prior Publication Data

US 2021/0134577 A1 May 6, 2021

(30) Foreign Application Priority Data

Nov. 5, 2019 (JP) ................................ 2019-200640

(51) Int. Cl.
*H01J 49/06* (2006.01)
*H01J 49/00* (2006.01)
(Continued)

(52) U.S. Cl.
CPC ........ *H01J 49/067* (2013.01); *H01J 49/0031* (2013.01); *H01J 49/165* (2013.01); *H01J 49/24* (2013.01); *H01J 49/4215* (2013.01)

(58) Field of Classification Search
None
See application file for complete search history.

(56) References Cited

U.S. PATENT DOCUMENTS 9,842,727 B2 12/2017 Gordon et al.
2013/0026359 A1* 1/2013 Kumashiro ............ H01J 49/10 250/283

(Continued)

FOREIGN PATENT DOCUMENTS

JP 2018120804 A * 8/2018
WO 2015077415 A1 5/2015

(Continued)

OTHER PUBLICATIONS

Notice of Allowance dated Dec. 6, 2022 from the Japanese Patent Office in JP Application No. 2019-200640.

*Primary Examiner* — James Choi
(74) *Attorney, Agent, or Firm* — Sughrue Mion, PLLC

(57) ABSTRACT

In a mass spectrometer including ion optical elements for transporting ions or controlling their behavior by electric fields, a device state determiner (41, 52) determines whether or not the mass spectrometer is in a normal state based on an ion intensity signal acquired by analyzing a predetermined sample. If the mass spectrometer is in an abnormal state, a charge-up determiner (42, 53) determines whether or not charge-up is present in the ion optical elements based on a change in ion intensity signal in an analysis on the predetermined sample observed when the voltages applied to the ion optical elements are changed according to a predetermined sequence. If charge-up is present, the charge-up determiner determines which ion optical element is likely to have the charge-up. A notifier (8, 61) notifies a user of the results of the determination by the device state determiner and the charge-up determiner.

8 Claims, 5 Drawing Sheets

(51) Int. Cl.

| | |
|---|---|
| ***H01J 49/16*** | (2006.01) |
| ***H01J 49/24*** | (2006.01) |
| ***H01J 49/42*** | (2006.01) |

(56) References Cited

U.S. PATENT DOCUMENTS

| | | | | |
|---|---|---|---|---|
| 2013/0099113 | A1* | 4/2013 | Quimby .............. | H01J 49/0422 250/282 |
| 2019/0013189 | A1 | 1/2019 | Okumura et al. | |

FOREIGN PATENT DOCUMENTS

| | | | |
|---|---|---|---|
| WO | 2017056173 | A1 | 4/2017 |
| WO | 2019229954 | A1 | 12/2019 |

* cited by examiner

MASS SPECTROMETER WITH CHARGE UP DETERMINER USING ION INTENSITY SIGNAL

TECHNICAL FIELD

The present invention relates to a mass spectrometer, and more specifically, to a technique for improving the ease of maintenance of a mass spectrometer.

BACKGROUND ART

A mass spectrometer normally performs an analysis under an extremely high degree of vacuum. Therefore, once the mass spectrometer is released from the evacuated state, a considerable amount of time is required to make the device available for the next analysis. It is therefore common practice for a mass spectrometer to be almost continuously energized to maintain its analyzing unit in the evacuated state, while being deenergized and released from the evacuated state when no analysis is planned to be performed in a considerable period of time, as in a weekend. Mass spectrometers often perform a device state check when they are energized and begin to operate. Some mass spectrometers are configured to regularly perform the device state check when no analysis is being performed, if the device has not been deenergized for a considerable period of time.

Checking the device state may include actually introducing a standard sample into the device and performing an analysis on the standard sample to determine whether or not the device is in an abnormal state based on the result of the analysis. For example, a mass spectrometer described in Patent Literature 1 is configured to automatically generate an ion originating from a standard sample by an internal ion source when the device begins to operate, and determine whether or not the device is in the normal state based on the result of a mass spectrometric analysis on the generated ion. A problem with the mass spectrometer described in Patent Literature 1 is that it merely informs the user of an abnormal state of the device, leaving the problem to be handled by the user. The user must identify the cause of the abnormal state of the device by himself/herself. It is extremely cumbersome and time-consuming for the user to perform such a task.

CITATION LIST

Patent Literature

Patent Literature 1: U.S. Pat. No. 9,842,727 B
Patent Literature 2: WO 2015/77415 A

SUMMARY OF INVENTION

Technical Problem

A common and frequent cause of device abnormality is the phenomenon of the "charge-up" (electrical charging) of a contaminated portion of any of the various ion optical elements used in the mass spectrometer. Mass spectrometers employ various ion optical elements, including an electrostatic lens, radio-frequency ion guide and quadrupole mass filter. Through a long period of time of use, those ion optical elements to undergo contamination due to various factors. A contaminant or foreign matter adhered to the surface of an ion optical element may form an insulating film, which causes that area of the surface to be easily charged when hit by an ion. Allowing the charge-up to develop to an excessive degree leads to a disturbance of the electric field created by the ion optical element and prevents a desired control of the ions. This causes the amount of ions reaching the ion detector to be decreased or unstable.

A conventional measure to cope with such a situation is to halt the device for the removal and cleaning of an ion optical element. This requires an operator to rely on their individual experience and determine which ion optical element is most likely to be undergoing contamination, or to observe the behavior (or the like) of an ion intensity acquired for a voltage applied to each relevant ion optical element and determine which ion optical element is most likely to be undergoing contamination. The efficiency and accuracy of the task performed in this manner significantly depend on the experience and skill of the operator. If an operator with an insufficient level of experience or skill performs such a task, a considerable amount of time will be needed to identify the ion optical element that needs cleaning, which lowers the maintenance efficiency of the device.

The present invention has been developed to solve the previously described problem. Its objective is to provide a mass spectrometer which can realize a high level of maintenance efficiency by enabling operators to locate an abnormal section of the device without relying on their personal experience or skill, while maximally avoiding unnecessary tasks when the device is in its normal state.

Solution to Problem

One mode of the present invention developed for solving the previously described problem is a mass spectrometer including a plurality of ion optical elements each of which is used for transporting ions or controlling the behavior of ions by an effect of an electric field, the mass spectrometer further including:

a device state determiner configured to perform, in response to a user instruction, or at a regular or irregular predetermined timing, an analysis on a predetermined sample, and to determine whether the mass spectrometer is in a normal state or abnormal state based on an ion intensity signal which is a result of the analysis;

a charge-up determiner configured to perform a charge-up check if it is determined by the device state determiner that the mass spectrometer is in an abnormal state, wherein the charge-up check includes determining whether or not charge-up is likely to be present in the plurality of ion optical elements and locating the charge-up if charge-up is likely to be present, based on a change in the ion intensity signal observed in the analysis performed on the predetermined sample while one or more of voltages applied to the plurality of ion optical elements are changed according to a predetermined sequence; and a notifier configured to notify a user of results of determination by the device state determiner and the charge-up determiner.

In the mass spectrometer according to the previously described mode of the present invention, there is no specific limitation on the kind of ionization method as well as the technique for separating ions according to their mass-to-charge ratios. Needless to say, the mass spectrometer may be a type of mass spectrometer in which ions generated by an ion source are dissociated one or more times, and the ions resulting from the dissociation are subjected to mass spectrometry. For example, this type includes tandem quadrupole mass spectrometers, quadrupole time-of-flight mass spectrometers, ion trap mass spectrometers and ion trap time-of-flight mass spectrometers.

The "ion optical elements" in the present context include all types of elements that use the effect of a direct-current electric field, radio-frequency electric field, or electric field formed by superposition of the two aforementioned kinds of electric fields so as to converge or diverge ions, accelerate or decelerate ions, or perform any of the previously mentioned operations on ions having a specific mass-to-charge ratio or falling within a specific range of mass-to-charge ratios. Specific examples include: a type of element called an electrostatic lens or ion guide; a skimmer, sampling cone, aperture electrode or similar element having an ion passage hole; a quadrupole mass filter and an element placed before or after the quadrupole mass filter, such as a pre-quadrupole mass filter or post-quadrupole mass filter; and an ion trap.

Advantageous Effects of Invention

In the mass spectrometer according to the previously described mode of the present invention, for example, upon receiving a predetermined instruction from a user, the device state determiner performs a mass spectrometric analysis on a standard sample, for example, and determines whether or not the mass spectrometer is in its normal state based on an ion intensity signal which is a result of the analysis. For example, if the ion intensity for a standard sample is lower than a predetermined threshold, the device state determiner determines that the mass spectrometer is in an abnormal state. If it has been determined that the mass spectrometer is in an abnormal state, the charge-up determiner performs a mass spectrometric analysis on the standard sample while individually and sequentially changing the voltages applied to a plurality of ion optical elements according to a predetermined sequence, and determines whether or not there is charge-up in the plurality of ion optical elements based on a change in the ion intensity signal observed in the analysis. If there is charge-up, the charge-up determiner identifies the ion optical element which has had the charge-up. The notifier notifies the user of the result of the determination by the device state determiner and that of the determination by the charge-up determiner through a display screen (or the like). If it has been determined by the charge-up determiner that there is no charge-up, the notifier can notify the user of the fact that the cause of the device abnormality is not the contamination of an ion optical element.

According to the previously described mode of the present invention, if it has been determined by the device-state check that the device is possibly in an abnormal state, the mass spectrometer subsequently and automatically checks for charge-up on each of the ion optical elements and notifies the user of the result. Accordingly, the mass spectrometer according to the previously described mode of the present invention enables even an operator with an insufficient level of experience or skill to understand whether or not the abnormality in the device state has resulted from contamination of an ion optical element, as well as which one of the plurality of ion optical elements has been contaminated. This allows the operator who has encountered an abnormal state of the device to perform appropriate and necessary tasks, such as the removal from the device of only the ion optical element which is undergoing contamination, and the cleaning of the element. Thus, the maintenance efficiency is improved.

As compared to the device state check, the charge-up check requires a longer period of time as well as consumes a greater amount of standard sample. The mass spectrometer according to the previously described mode of the present invention does not require the charge-up check to be performed when the device is in its normal state. By preventing the checking task from being unnecessarily performed, the device can save time and the sample.

DESCRIPTION OF EMBODIMENTS

A quadrupole mass spectrometer as one embodiment of the present invention is hereinafter described with reference to the attached drawings.

Figure 1:
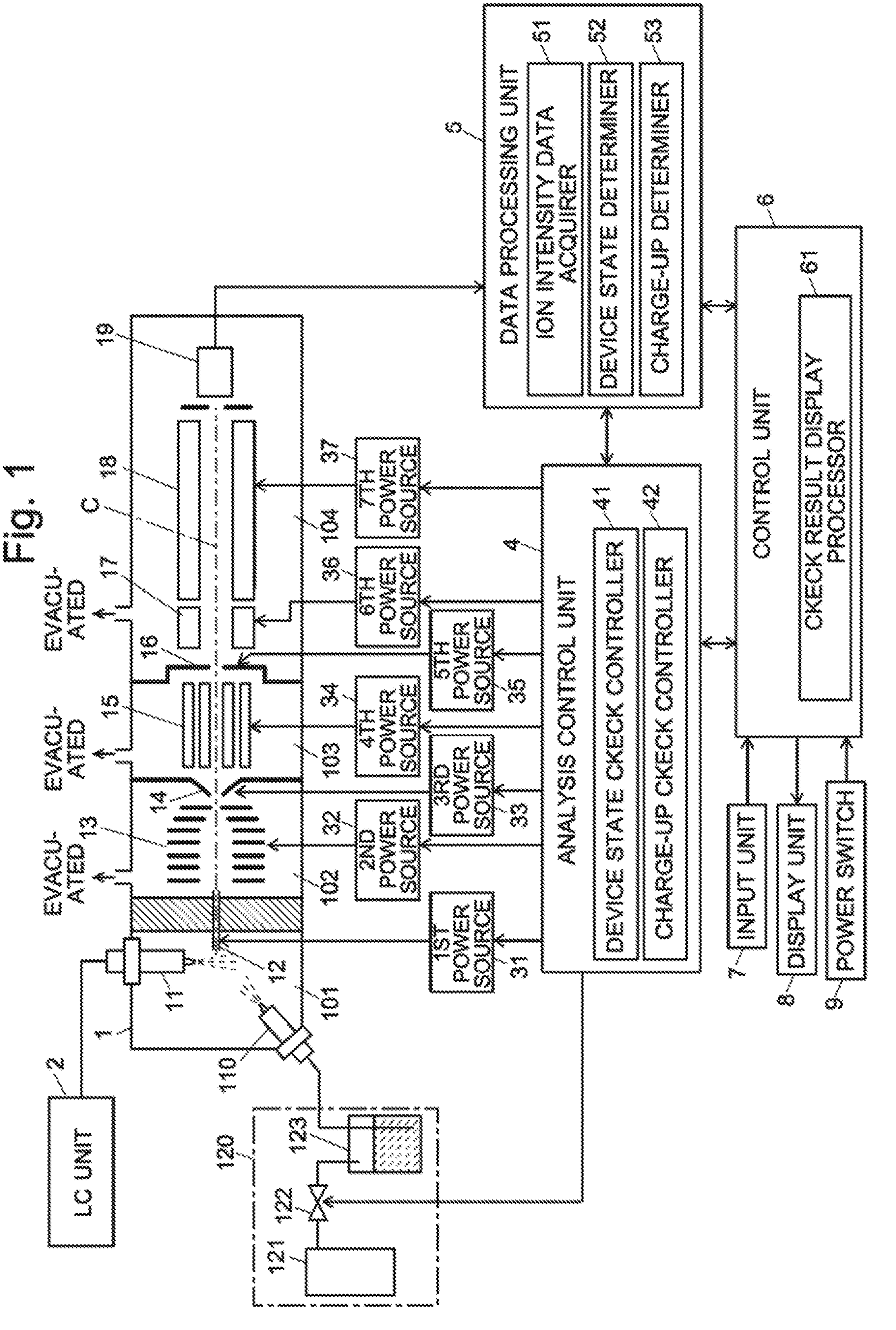
FIG. 1 is a configuration diagram showing the main components of a quadrupole mass spectrometer as one embodiment of the present invention.

FIG. 1 is a configuration diagram showing the main components of the quadrupole mass spectrometer according to the present embodiment.

The quadrupole mass spectrometer according to the present embodiment has a chamber 1, which includes an ionization chamber 101 for ionizing compounds in a sample at substantially atmospheric pressure and an analysis chamber 104 maintained at a high degree of vacuum for performing a mass spectrometric analysis and detection of ions, as well as first and second intermediate vacuum chambers 102 and 103 located between the ionization chamber 101 and the analysis chamber 104, having their degrees of vacuum increased in a stepwise manner. The ionization chamber 101 communicates with the first intermediate vacuum chamber 102 through a heated capillary 12 which is heated to an appropriate temperature with a heater (not shown). The first intermediate vacuum chamber 102 communicates with the second intermediate vacuum chamber 103 through a micro-sized ion-passage hole formed at the apex of a substantially conical skimmer 14. The second intermediate vacuum chamber 103 communicates with the analysis chamber 104 through a micro-sized ion-passage hole formed in an aperture electrode 16.

The ionization chamber 101 contains a main electrospray ionization (ESI) probe 11 configured to ionize compounds in a liquid sample by electrostatically spraying the liquid sample, and a sub ESI probe 110 which is almost identical in structure to the former probe 11. The first and second intermediate vacuum chambers 102 and 103 respectively contain an ion lens 13 and a multipole ion guide 15 both of which are configured to transport ions while converging them by the effect of a radio-frequency electric field. The ionization chamber 104 contains a pre-quadrupole mass filter 17, main quadrupole mass filter 18 and ion detector 19 arranged along an ion beam axis C.

The ion lens 13 includes a plurality of (e.g. four) virtual rod electrodes arranged around the ion beam axis C, with each virtual rod electrode formed by a plurality of plate electrodes arrayed at predetermined intervals along the ion beam axis C. The multipole ion guide 15 includes a plurality of (e.g. eight) rod electrodes arranged around the ion beam axis C, with each rod electrode extending parallel to the ion beam axis C. The pre-quadrupole mass filter 17 and the main quadrupole mass filter 18 each include four rod electrodes arranged around the ion beam axis C, with each rod electrode extending parallel to the ion beam axis C.

The heated capillary 12, ion lens 13, skimmer 14, multipole ion guide 15, aperture electrode 16, pre-quadrupole mass filter 17 and main quadrupole mass filter 18 are respectively supplied with voltages from first through seventh power sources 31-37 each of which produces either a direct-current voltage or a voltage composed of a radio-frequency voltage and a direct-current voltage added together. Each of the mentioned elements is a type of ion optical element which transports ions while controlling the behavior of the ions, i.e. which converges or diverges ions and/or accelerates or decelerates ions by the effect of an electric field (radio-frequency electric field or direct-current electric field).

The main ESI probe 11 is connected to a liquid chromatograph (LC) unit 2 so that an eluate (liquid sample) exiting from a column of the LC unit 2 is supplied to the main ESI probe 11. The sub ESI probe 110 is connected to a standard sample supply unit 120. The standard sample supply unit 120, which includes a nitrogen gas supply source 121, valve 122 and sample tank 123, is configured to supply a standard sample stored in the sample tank 123 to the sub ESI probe 110 by a gas-pressure liquid-sending system disclosed in Patent Literature 2 (or other related documents). For example, the standard sample may be, but not limited to, polyethylene glycol (PEG) or polypropylene glycol (PPG).

The power sources 31-37 have their operations individually controlled by an analysis control unit 4. The control unit 4 includes a device state check controller 41 and a charge-up check controller 42 as its functional blocks. A data processing unit 5 is configured to receive detection signals acquired with the ion detector 19 and performs various tasks, such as the creation of a mass spectrum, mass chromatogram, total ion chromatogram or other forms of information as well as qualitative determination of an unknown compound or quantitative determination of a target compound. The data processing unit 5 includes, as its characteristic functional blocks, an ion intensity data acquirer 51, device state determiner 52 and charge-up determiner 53.

A control unit 6 is responsible for providing a system control at a higher level than the analysis control unit 4 as well as a user interface through an input unit 7, display unit 8 and power switch 9. The control unit 6 includes a check result display processor 61 as a functional block which is responsible for characteristic operations. The control unit 6, data processing unit 5, and analysis control unit 4 can typically be realized by using a personal computer as a hardware resource, with their respective functions realized by executing, on the computer, dedicated controlling-processing software installed on the same computer.

A normal mode of analyzing operation for an analysis of a component in a liquid sample supplied from the LC unit 2 in the quadrupole mass spectrometer according to the present embodiment is hereinafter schematically described.

When a liquid sample that has exited from the column of the LC unit 2 is introduced into the main ESI probe 11, the liquid sample is given electric charges from the tip of the probe 11 and sprayed into the ionization chamber 101 in the form of micro-sized, electrically charged droplets. Those charged droplets are broken into even smaller particles due to contact with the surrounding air, causing the solvent in the droplets to be vaporized. In this process, component molecules in the droplets are ejected with electric charges, whereby ions are generated. Due to the pressure difference between the two ends of the heated capillary 12, a stream of air is formed, flowing from the ionization chamber 101 into the first intermediate chamber 102. The generated ions are thereby drawn into the heated capillary 12 and sent into the first intermediate vacuum chamber 102. Ions originating from the sample are converged by the ion lens 13 and sent into the second intermediate vacuum chamber 103 through the ion passage hole at the apex of the skimmer 14. The ions are subsequently converged by the multipole ion guide 15 and sent into the analysis chamber 104 through the ion passage hole formed in the aperture electrode 16.

In the analysis chamber 104, the ions derived from the sample are introduced into the main quadrupole mass filter 18 via the pre-quadrupole mass filter 17. A voltage produced by superposing a radio-frequency voltage on a direct-current voltage is applied from the seventh power source 37 to the rod electrodes of the main quadrupole mass filter 18, so that only ions having a mass-to-charge ratio corresponding to that voltage are allowed to pass through the main quadrupole mass filter 18 and reach the ion detector 19. The ion detector 19 produces an ion intensity signal corresponding to the amount of ions which have reached the ion detector 19. The data processing unit 5 processes detection data obtained by digitizing the ion intensity signal.

During the previously described analysis, the heated capillary 12, ion lens 13, skimmer 14 and other ion optical elements gradually undergo contamination due to the adhesion of the charged particles from which the solvent has been insufficiently vaporized as well as the component molecules and other neutral particles. Those contaminants gradually form an insulating film. When this film is hit by ions, charge-up occurs on the film due to the electric charges of the ions. The quadrupole mass spectrometer according to the present embodiment has a charge-up checking function to check for the presence or absence of such charge-up and provide an operator with information concerning an ion optical element which has charge-up, i.e. which is undergoing contamination. A detailed description of the automatic device checking function, including the charge-up check, will be hereinafter given.

Figure 2:
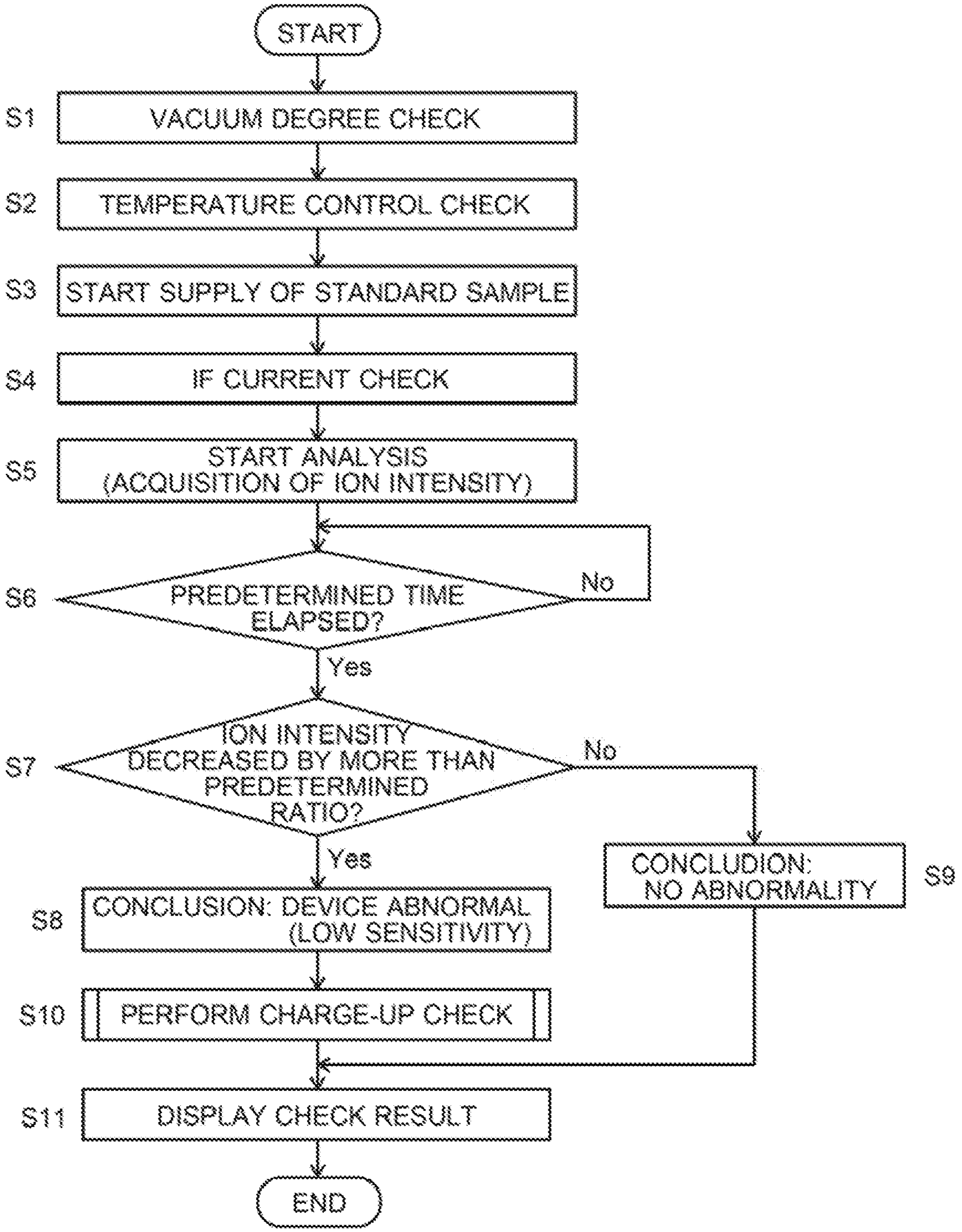
FIG. 2 is a flowchart of an automatic checking process in the quadrupole mass spectrometer according to the present embodiment.
Figure 3:
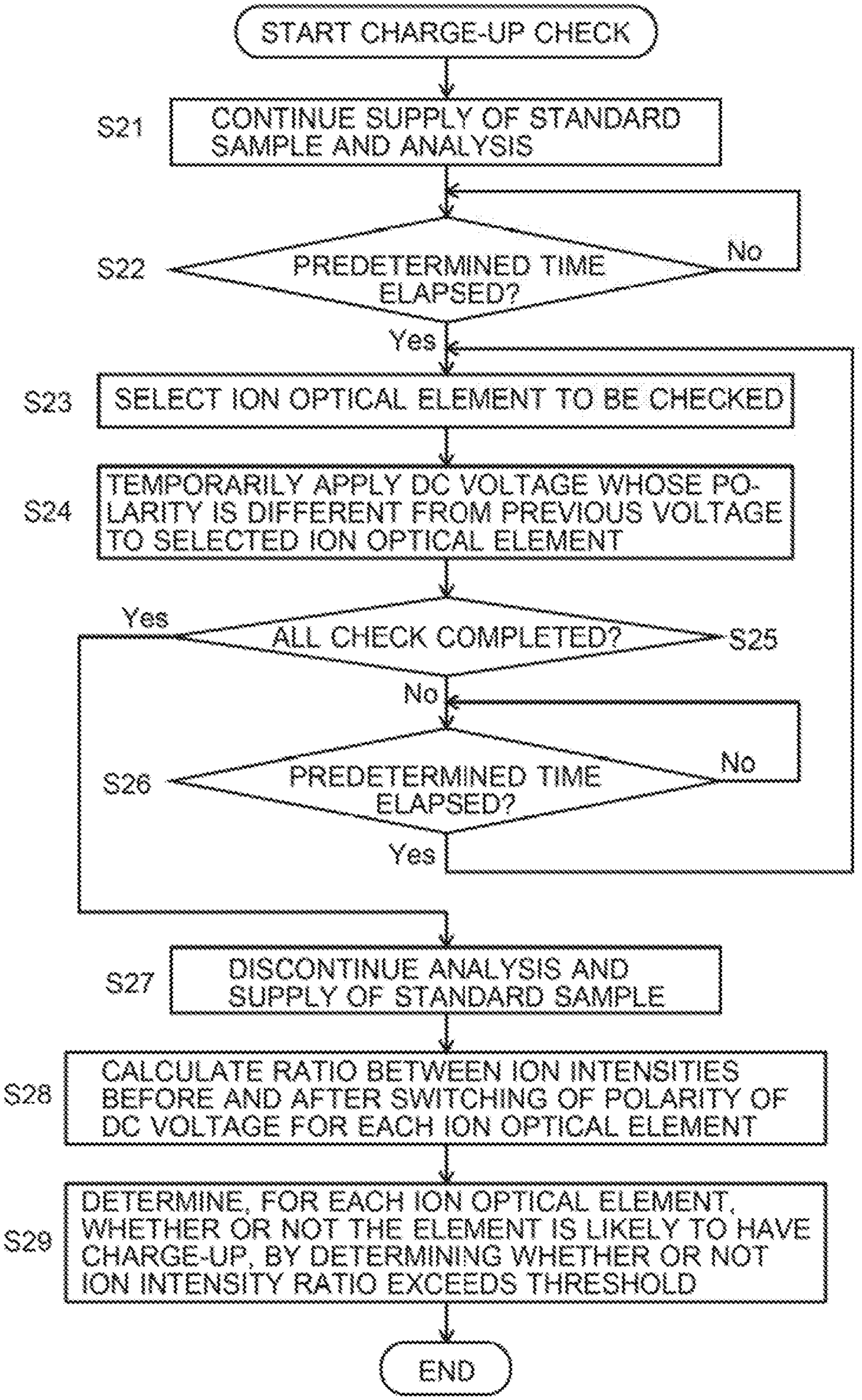
FIG. 3 is a flowchart of a charge-up checking process in the quadrupole mass spectrometer according to the present embodiment.
Figure 4:
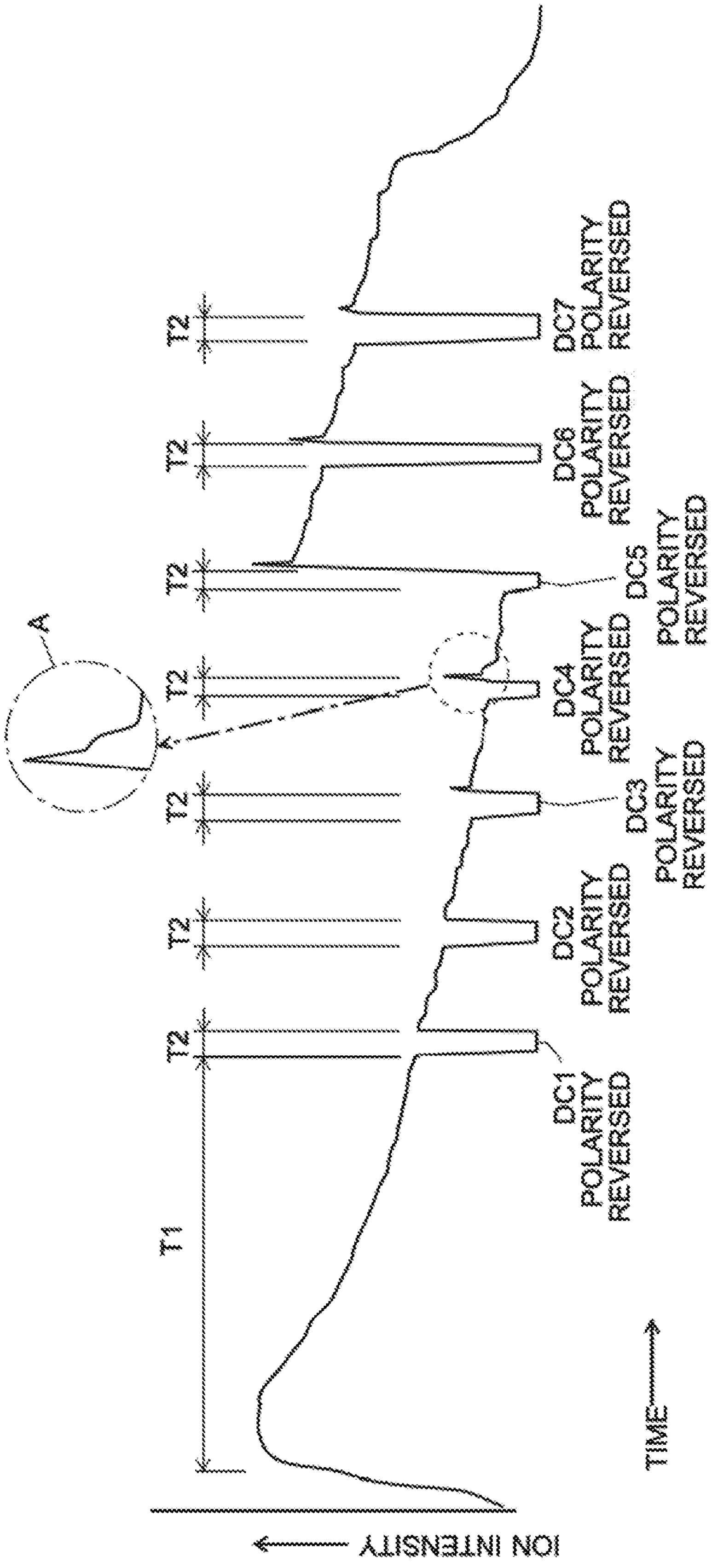
FIG. 4 is a waveform diagram for explaining a charge-up determination method in the quadrupole mass spectrometer according to the present embodiment.

FIG. 2 is a flowchart of the automatic checking process, FIG. 3 is a flowchart of the charge-up checking process, and FIG. 4 is a diagram illustrating a charge-up determination method.

In the quadrupole mass spectrometer according to the present embodiment, the automatic device check as shown in FIG. 2 is performed when the device which is halted is energized by an operator using the power switch 9 and begins operation, or when the device which is in the energized state has received an instruction to perform the device state check from the operator through a predetermined operation on the input unit 7. It should be noted that the automatic check may also be performed at any other regular or irregular timing; for example, the automatic check may be performed once in a week at a specified time of day. The following description assumes the situation in which the device has been energized.

When the device has been energized, the control unit 6 sends an instruction to the analysis control unit 4, which activates a vacuum pump (not shown) to evacuate each chamber. The automatic check is initiated, for example, when the detection value of a vacuum gauge (not shown) measuring the gas pressure within the analysis chamber 104 has fallen to be equal to or lower than a predetermined value.

The device state check controller 41 initially checks the degree of vacuum within the first intermediate vacuum chamber 102 (Step S1).

Specifically, it is determined whether or not the gas pressure detected with a vacuum gauge (not shown) measuring the gas pressure within the first intermediate vacuum chamber 102 is equal to or lower than a predetermined value. Since the first intermediate vacuum chamber 102 communicates with the ionization chamber 101, which is maintained at substantially atmospheric pressure, through the heated capillary 12, a stream of air continuously flows into the first intermediate vacuum chamber 102 through the heated capillary 12. Therefore, the degree of vacuum within the first intermediate vacuum chamber 102 normally does not exceed a certain level. In other words, if the gas pressure within the first intermediate vacuum chamber 102 has reached an unexpectedly low level, it is most likely that the heated capillary 12 is clogged, causing the blockage or decrease of the flow of air from the ionization chamber 101. Accordingly, if it has been determined that the detected gas pressure is equal to or lower than the predetermined value, it is concluded that the heated capillary 12 is possibly clogged, and the processing is discontinued at that point.

If it has been determined in Step S1 that the detected gas pressure is higher than the predetermined value, the device state check controller 41 subsequently checks the temperature control related to some components, such as the heater for heating the heated capillary 12 and the heater for heating a gas provided within the ionization chamber 101 (Step S2).

Specifically, for each of those heaters, the device state check controller 41 obtains the temperature difference between the set value of the temperature of the heater and the monitored value of the temperature acquired with the temperature sensor attached to the heater, as well as the duty cycle of a pulsed voltage applied for driving the heater (which reflects the heating power of the heater). Then, the device state check controller 41 determines whether or not the temperature difference is equal to or larger than a predetermined value, and whether or not the duty cycle is equal to or larger than a predetermined value. If the temperature difference is unexpectedly large, or if the driving power required for achieving the set temperature is unexpectedly high, it is most likely that there is a problem with the heater itself or its driving circuit. Accordingly, if it has been determined that the temperature difference is equal to or larger than a predetermined value, or that the duty cycle is equal to or larger than a predetermined value, the processing is discontinued at that point.

If it has been determined in Step S2 that there is no problem with the temperature control, the device state check controller 41 subsequently opens the valve 122 in the standard sample supply unit 120. Then, nitrogen gas is supplied from the nitrogen gas supply source 121 into the upper space in the sample tank 123. Due to the pressure of this nitrogen gas, the standard sample stored in the tank is supplied to the sub ESI probe 110 (Step S3). The sub ESI probe 110 ionizes components in the standard sample by the same mechanism as the previously described ionization of the components in the liquid sample by the main ESI probe 11. The ions derived from the standard sample are introduced through the ion lens 13 and the multipole ion guide 15 into the main quadrupole mass filter 18 and ultimately reach the ion detector 19 after passing through the main quadrupole mass filter 18.

Immediately after the beginning of the supply of the standard sample, the device state check controller 41 checks the value of an electric current (IF current) induced by a high voltage applied for imparting electric charges to the sample solution at the tip portion of the sub ESI probe 110 (Step S4).

Specifically, the device state check controller 41 monitors the output current of a high-voltage power source which applies the high voltage to the tip portion of the sub ESI probe 110, and determines whether or not the detected value of the current is less than a predetermined reference value. When the standard sample is not smoothly supplied to the tip portion of the sub ESI probe 110, the IF current does not sufficiently flow. The IF current will also be insufficient if the high voltage is not applied to the tip portion of the sub ESI probe 110, or if the ionization at the sub ESI probe 110 is not properly taking place. Accordingly, if it has been determined that the detection value of the IF current is less than the predetermined reference value, the processing is discontinued at that point.

If it has been determined in Step S4 that there is no problem with the IF current, the device state check controller 41 controls the power sources 31-37 and other related sections so as to repeatedly perform a selected ion monitoring (SIM) measurement with a predetermined mass-to-charge ratio selected as the target according to the kind of standard sample. Thus, a mass spectrometric analysis is initiated, and the ion intensity data acquirer 51 in the data processing unit 5 begins to collect ion intensity data (Step S5). In the case where PEG is used as the standard sample solution, a positive ion having a mass-to-charge ratio of m/z 168.1 can be used as the target of the SIM measurement.

The device state determiner 52 receives ion intensity data in the initial phase of the analysis from the ion intensity data acquirer 51. After waiting for the elapse of a predetermined period of time (Step S6), the device state determiner 52 once more receives ion intensity data from the ion intensity data acquirer 51 and determines whether or not the ratio of the decrease in ion intensity from the level before the beginning of the predetermined period of time is less than a predetermined value (Step S7). That is to say, the device state determiner 52 determines the amount of decrease in detection sensitivity over the predetermined period of time and concludes that there is an abnormality in the device if the detection sensitivity has significantly decreased (Step S8). On the other hand, if the decrease in detection sensitivity is insignificant, it is determined that there is no abnormality in the device (Step S9). If it has been determined that there is no abnormality in the device, the supply of the standard sample solution is discontinued, and the analysis of the standard sample is terminated.

It is preferable that the predetermined period of time in Step S6 has a length that is sufficient for observing a decrease in ion intensity due to the charge-up of a contaminated site of an ion optical element when any of the ion optical elements is actually contaminated. Specifically, the length of time is normally within a range from 5 to 10 minutes.

If it has been determined in Step S8 that there is an abnormality in the device, the most likely cause is the charge-up phenomenon resulting from the contamination of an ion optical element. Accordingly, a charge-up check is performed to determine whether or not the problem has actually been caused by charge-up, and to identify an ion optical element on which the charge-up has occurred if charge-up has been confirmed as the cause (Step S10).

More specifically, the device continues the supply of the standard sample and the collection of the ion intensity data for the standard sample (Step S21), and further waits for the elapse of a predetermined period of time (Step S22). Step S22 may be omitted if a sufficient length of time for the charge-up to occur has already been secured in Step S6.

After the predetermined period of time has elapsed in Step S22, the charge-up check controller 42 selects one of the ion optical elements to be checked (Step S23) and controls one of the power sources 31-37 so that the direct-current voltage applied to the ion optical element is changed for a predetermined period of time, to a predetermined voltage whose polarity is different from that of the preceding voltage (Step S24). In the present example, the seven ion optical elements, i.e. the heated capillary 12, ion lens 13, skimmer 14, multipole ion guide 15, aperture electrode 16, pre-quadrupole mass filter 17 and main quadrupole mass filter 18 are individually checked in the mentioned order. Accordingly, in the flowchart shown in FIG. 3, when the processing of Steps S23 and S24 is performed for the first time, the polarity of the direct-current voltage applied from the first power source 31 to the heated capillary 12 is reversed only for a predetermined period of time.

The aim of the reversal of the polarity of the direct-current voltage is to temporarily apply, to the ion optical element, a voltage having the same polarity as that of the electric charges accumulated on a possibly contaminated portion of the ion optical element, thereby attempting to disperse those charges and resolve the charge-up. Accordingly, the period of time for the reversal of the polarity of the direct-current voltage should have an appropriate length so that the charge-up can be temporarily resolved. Understandably, increasing the length of time more assuredly resolves the charge-up, while setting an excessive length of time means taking too much time for the charge-up checking process. Accordingly, the length of time should normally be within a range from a few to ten seconds. As for the pre-quadrupole mass filter 17 and the main quadrupole mass filter 18, it has empirically been revealed that a considerable length of time is required to resolve the charge-up. Accordingly, for those ion optical elements, it is preferable to set the period of time of the reversal of the polarity of the direct-current voltage to be roughly from one to two minutes, or even longer, and more preferably, equal to or longer than two minutes. The voltage value of the direct-current voltage (absolute value of the voltage) at the moment of the temporary reversal of the polarity needs to be sufficiently high for temporarily resolving the charge-up. In normal cases, it should be roughly within a range from 10 to 50 V.

After the polarity of the direct-current voltage applied to the ion optical element selected in Step S23 has been changed for the predetermined period of time, the charge-up check controller 42 determines whether or not the previously described processing of Step S24 has been completed for all ion optical elements that need to be checked (Step S25). If there is an ion optical element remaining to undergo the processing of Step S24, the charge-up check controller 42 waits for a predetermined period of time (Step S26) and returns to Step S23.

After returning from Step S26 to Step S23, the charge-up check controller 42 selects one of the ion optical elements remaining to be checked, excluding those which have already been selected. Thus, the direct-current voltages respectively applied to the heated capillary 12, ion lens 13, skimmer 14, multipole ion guide 15, aperture electrode 16, pre-quadrupole mass filter 17 and main quadrupole mass filter 18 are sequentially and temporarily changed in step with the repetition of the processing of Steps S23 through S26. Meanwhile, the ion intensity data acquirer 51 continues collecting the ion intensity data for the ions originating from the standard sample.

After the direct-current voltage applied from the seventh power source 37 to the main quadrupole mass filter 18 has been temporarily changed, the result of the determination in Step S25 becomes "Yes", and the operation proceeds to Step S27, to discontinue the supply of the standard sample by the standard sample supply unit 120 and the analyzing operation.

Through the previously described analyzing operation, a set of ion intensity data are continuously collected and stored by the ion intensity data acquirer 51 under the condition that the direct-current voltages applied to the heated capillary 12, ion lens 13, skimmer 14, multipole ion guide 15, aperture electrode 16, pre-quadrupole mass filter 17 and main quadrupole mass filter 18 are individually and temporarily changed.

Based on the stored ion intensity data, the charge-up determiner 53 checks for the presence or absence of charge-up as follows, and locates the section in which the charge-up has occurred, i.e. the contaminated section.

FIG. 4 is a measured example of the ion intensity observed during the analyzing operation in the charge-up checking process. In FIG. 4, DC1-DC7 represent the direct-current voltages respectively applied from the first through seventh power sources 31-37 to the corresponding ion optical elements. Period T1 in FIG. 4 is the period of time during which the processing of Step S22 (or Step S6) is repeated. Although high levels of ion intensity are initially observed within this period, the ion intensity gradually decreases with the passage of time due to the charge-up. After this phase, a direct-current voltage with the polarity reversed from that of the preceding voltage is temporarily applied to each of the ion optical elements starting from the heated capillary 12. During the period T2 in which this voltage is applied, no ion can pass through the selected ion optical element, so that the ion intensity falls to almost zero. The direct-current voltage applied to the ion optical element is subsequently returned to the original polarity, whereupon the ion intensity also increases accordingly.

As explained earlier, if charge-up is present on an ion optical element, the reversal of the polarity of the direct-current voltage applied to the ion optical element will disperse at least a portion of the electric charges accumulated on the contaminated site, so that the charge-up will be resolved or reduced. Therefore, in the case where a decrease in ion intensity has been caused by charge-up, the ion intensity significantly increases after the resolution or reduction of the charge-up. By comparison, in the case where there is no charge-up on the ion optical element, the reversal of the polarity of the direct-current voltage applied to the ion optical element induces no significant change in ion intensity.

FIG. 4 shows that a noticeable increase in ion intensity was observed only when DC5, i.e. the direct-current voltage applied from the fifth power source 35 to the aperture electrode 16, was temporarily changed. This indicates that there was charge-up on the aperture electrode 16, which was resolved by the temporary application of the direct-current voltage whose polarity was different from that of the preceding voltage. Thus, it is possible to identify the ion optical element on which charge-up was present, i.e. one which is undergoing contamination, based on the magnitude of the change in ion intensity before and after the period T2 during which the direct-current voltage was temporarily changed. It should be noted that an increase in ion intensity with an extremely short duration may possibly be observed immediately after the period T2, as indicated by label "A" in FIG. 4. This phenomenon is due to the influence of the spatial accumulation of ions and is unrelated to the charge-up. Accordingly, it is preferable to determine whether or not charge-up is present based on the magnitude of the change in ion intensity before and after the period T2 while avoiding a transient increase in ion intensity which immediately follows the period T2.

Accordingly, based on the ion intensity data, the charge-up determiner 53 determines, for each ion optical element to be checked, an ion intensity value I1 immediately before the period T2 during which the direct-current voltage is changed and an ion intensity value I2 at a point in time which is a predetermined length of time (e.g. 1 second) later than the end of the period T2, and calculates the intensity ratio P=I2/I1 (Step S28). The "predetermined length of time" is a period of time for avoiding a transient increase in ion intensity which may occur immediately after the period T2. The charge-up determiner 53 compares this ion intensity ratio P with a previously specified threshold, and determines that charge-up is likely to be present if the ratio exceeds the threshold (Step S29). The threshold of this determination can be previously determined based on appropriate information, such as an experimentally determined variation of the ion intensity. For example, it may be approximately 1.5.

Through the previously described determination process, it is possible to determine that charge-up is likely to be present on the aperture electrode 16 in the case of the ion intensity shown in FIG. 4. Needless to say, charge-up may be present on two or more ion optical elements. In some cases, a factor different from charge-up may cause the decrease in ion intensity, in which case the determining process may possibly result in the conclusion that no charge-up is present on any of the ion optical elements.

After the charge-up check result has been obtained by the charge-up determiner 53, the check result display processor 61 displays the check result on the screen of the display unit 8, including the determination result obtained by the device state determiner 52 and that obtained by the charge-up determiner 53, and notifies the operator of those results (Step S11). A preferable form of the display of the charge-up check result is a diagram which schematically illustrates the ion optical element that is likely to be contaminated. If a contaminated ion optical element has been located, the check result display processor 61 may additionally display information concerning a document describing maintenance methods for resolving the contamination of the ion optical element. Specifically, for example, a link to an electronic file of an instruction manual installed as a portion of the software may be displayed.

As described thus far, the quadrupole mass spectrometer according to the present embodiment can automatically check the device state when the device is started or has received an instruction from an operator. If a decrease in sensitivity has been detected, the device automatically determines which section is likely to have charge-up, i.e. which section is undergoing contamination, and notifies the operator of that section. The operator only needs to remove the contaminated ion optical element from the chamber 1 and clean it; there is no need to perform other unnecessary tasks. Avoiding the unnecessary cleaning work significantly lowers the chance of the problem of scratches on an ion optical element or foreign matters adhering to it. The charge-up check requires a certain amount of time since the voltages applied to a plurality of ion optical elements are individually and sequentially changed. However, since the device previously checks for the presence or absence of a device-state abnormality which may possibly be caused by charge-up, the charge-up check does not need to be performed when there is no abnormality in the device state.

In the previous description, the charge-up check is performed for seven ion optical elements, i.e. the heated capillary 12, ion lens 13, skimmer 14, multipole ion guide 15, aperture electrode 16, pre-quadrupole mass filter 17, and main quadrupole mass filter 18. It is not always necessary to check for charge-up in all of those elements. Accordingly, the device may additionally be configured to allow an operator to appropriately specify which ion optical elements should be checked.

In the previous description, whether or not charge-up is present is determined in Steps S28 and S29 by calculating the ratio of the ion intensity value immediately before the period T2 during which the direct-current voltage is changed, to an ion intensity value after the end of the period T2, and comparing the ratio with the threshold. A different method may be used for this determination.

As can be seen in FIG. 4, after charge-up has been resolved by temporarily applying a direct-current voltage whose polarity is opposite to that of the preceding voltage to an ion optical element, the ion intensity almost fully returns to the level at the beginning of the analysis. Accordingly, it is possible to determine whether or not charge-up is present by calculating an intensity ratio or intensity difference between the ion intensity value at the beginning of the analysis and an ion intensity value after the end of the period T2, and comparing the calculated value with a threshold. The ion intensity value at the beginning of the analysis is roughly reproducible under the same analysis conditions. Therefore, an ion intensity value actually measured for the same standard sample with no charge-up present may be stored as a reference value in a memory, and whether or not charge-up is present may be determined by calculating an intensity ratio or intensity difference between the reference value and an ion intensity value after the end of the period T2, and comparing the calculated value with a threshold. It should be noted that those determination methods can provide correct results only in the case where there is charge-up on only one of the ion optical elements.

Figure 5:
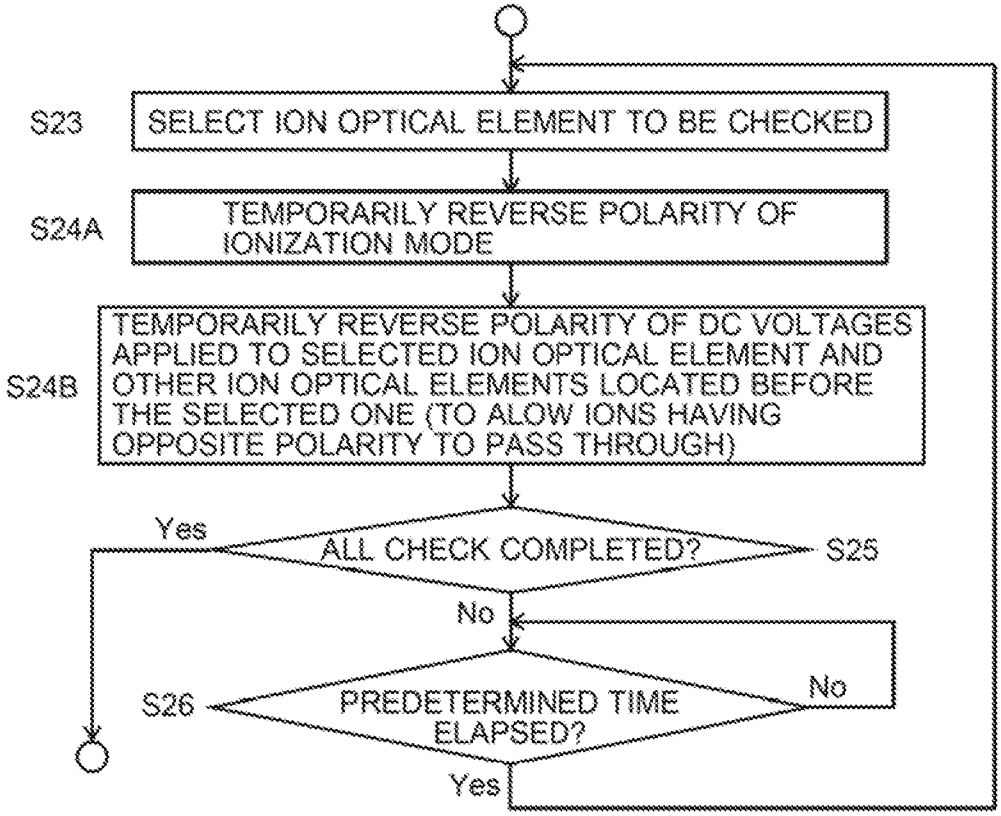
FIG. 5 is a flowchart of a portion of the charge-up checking process in a quadrupole mass spectrometer according to a modified example.

The quadrupole mass spectrometer according to the previous embodiment can be modified as follows:

FIG. 5 is a flowchart of a portion of the charge-up checking process according to the modified example. The only difference from the charge-up checking process performed by the device as shown in FIG. 3 exists in the processing of Step S24 in FIG. 3. The processing which corresponds to Step S24 in FIG. 3 is now represented by the two steps S24A and 24B in FIG. 5.

The device according to the previous embodiment is configured to resolve charge-up by reversing the polarity of the direct-current voltage applied to an ion optical element from that of the preceding voltage. However, simply applying the direct-current voltage with the opposite polarity may not be sufficient to resolve charge-up for some reasons, such as a high degree of contamination. The present method is particularly effective in such a case.

The charge-up check controller 42 selects one of the ion optical elements to be checked (Step S23) and temporarily reverses the polarity of the ionization mode so that the ions generated by the sub ESI probe 110 will have the opposite polarity (Step S24A). Specifically, the polarity of the high voltage applied to an electrode located in the tip portion of the probe for electrically charging the liquid sample is reversed for a predetermined period of time. The ionization mode is thereby temporarily switched from the positive to negative ionization, and negative ions are generated. Meanwhile, the power sources 31-37 are controlled so that the polarity of the direct-current voltage applied to the ion optical element selected in Step S23 and those applied all ion optical elements located before the selected element is temporarily reversed for a predetermined period of time (Step S24B). For example, if the skimmer 14 is selected as the element to be checked, the polarity of the direct-current voltages applied to the three ion optical elements of the heated capillary 12, ion lens 13 and skimmer 14 is reversed.

Since the polarity of the state of the direct-current electric field in the ion-travelling path from the ion entrance side (i.e. from the heated capillary 12) to the selected ion optical element is thus reversed along with the reversal of the polarity of the ionization mode, the negative ions originating from the standard sample generated by the sub ESI probe 110 can reach the selected ion optical element. If there is charge-up on the selected ion optical element, the ions which have reached neutralize the electric charges accumulated on the ion optical element. Thus, the charge-up can be more effectively resolved by the neutralizing effect of the ions with the opposite polarity coming in contact with the accumulated charges, in addition to the charge-dispersing effect produced by the application of the direct-current voltage with the opposite polarity to the selected ion optical element as in the device according to the previous embodiment. This enables more reliable determination on whether or not charge-up is present as well as more reliable identification of the section in which the charge-up has occurred.

In the device according to the previous embodiment, one or more of the checks in Steps S1, S2 and S4 may be appropriately omitted. The minimum requirement is to perform the device state check as shown in Steps S5 through S7 and the charge-up check as shown in Step S10 (or Steps S21 through S29).

The previous embodiment is an example in which the present invention is applied in a normal type of quadrupole mass spectrometer. The present invention is also applicable in a tandem quadrupole mass spectrometer having two quadrupole mass filters located before and after a collision cell. Furthermore, the present invention is applicable not only in quadrupole mass spectrometers or tandem quadrupole mass spectrometers, but may also be applied in other types of devices, such as a quadrupole time-of-flight (Q-TOF) mass spectrometer.

The previous embodiment and modified example are mere examples of the present invention. It is evident that any change, addition or modification appropriately made within the spirit of the present invention in any aspect other than those already described will also fall within the scope of claims of the present application.

[Various Modes]

A person skilled in the art can understand that the previously described illustrative embodiment is a specific example of the following modes of the present invention.

(Clause 1) A mass spectrometer according to one mode of the present invention is a mass spectrometer including a plurality of ion optical elements each of which is used for transporting ions or controlling the behavior of ions by an effect of an electric field, the mass spectrometer further including:

a device state determiner configured to perform, in response to a user instruction, or at a regular or irregular predetermined timing, an analysis on a predetermined sample, and to determine whether the mass spectrometer is in a normal state or abnormal state based on an ion intensity signal which is a result of the analysis;

a charge-up determiner configured to perform a charge-up check if it is determined by the device state determiner that the mass spectrometer is in an abnormal state, wherein the charge-up check includes determining whether or not charge-up is likely to be present in the plurality of ion optical elements and locating the charge-up if charge-up is likely to be present, based on a change in the ion intensity signal observed in the analysis performed on the predetermined sample while one or more of voltages applied to the plurality of ion optical elements are changed according to a predetermined sequence; and a notifier configured to notify a user of results of determination by the device state determiner and the charge-up determiner.

The mass spectrometer described in Clause 1 enables even an operator with an insufficient level of experience or skill to understand whether or not the abnormality in the device state has resulted from contamination of an ion optical element, as well as which one of the plurality of ion optical elements has been contaminated. This allows the operator who has encountered an abnormal state of the device to perform appropriate and necessary tasks, such as the removal from the device of only the ion optical element which is undergoing contamination, and the cleaning of the element. Thus, the maintenance efficiency is improved. Additionally, as compared to the device state check, the charge-up check requires a longer period of time as well as consumes a greater amount of sample. The mass spectrometer described in Clause 1 does not require the charge-up check to be performed when the device is in its normal state. By preventing the checking task from being unnecessarily performed, the device can save time and the sample.

(Clause 2) In the mass spectrometer described in Clause 1, the charge-up determiner may include:

a controller configured to control each relevant section of the mass spectrometer so as to sequentially select each of the two, more or all of the plurality of ion optical elements, and perform an operation for resolving charge-up on the selected ion optical element, after performing the analysis for a predetermined period of time; and a determination processor configured to determine a degree of contamination of each ion optical element under a control of the controller, based on a change in ion intensity signal observed when the operation for resolving charge-up on the ion optical element was performed.

(Clause 3) In the mass spectrometer described in Clause 2, the operation for resolving charge-up on the selected ion optical element by the controller may include temporarily applying a direct-current voltage whose polarity is different from the polarity of the direct-current voltage applied to the selected ion optical element when the analysis is performed, or a direct-current voltage whose polarity is the same as the polarity of an ion to be analyzed.

When the polarity of the direct-current voltage applied to an ion optical element is temporarily changed to a polarity which is different from the polarity used in the analysis, the polarity of the voltage is the same as that of the electric charges accumulated on the contaminated portion of the ion optical element. Therefore, the electric charges accumulated on the contaminated portion are dispersed by electrostatic repulsion, and the charge-up is temporarily resolved or reduced. Based on this, whether or not the ion optical element in question is contaminated can be determined.

(Clause 4) In the mass spectrometer described in Clause 2, the operation for resolving charge-up on the selected ion optical element by the controller may include generating, in an ion source, an ion whose polarity is different from the polarity used in the analysis, and driving each ion optical element so as to allow the ion to pass through the selected ion optical element and all ion optical elements located on an upstream side of an ion stream with respect to the selected ion optical element.

Electric charges accumulated on a contaminated portion of an ion optical element during an analyzing operation have the same polarity as the ions. Therefore, if ions whose polarity is different from that of the ions generated in the analysis are generated by the ion source and allowed to reach an ion optical element on which electric charges are accumulated, the accumulated electric charges are neutralized by the ions since the polarity of those ions is opposite to that of the accumulated charges. Additionally, when an ion optical element is driven so as to allow those ions to pass through, the polarity of the direct-current voltage applied to the ion optical element becomes temporarily different from the polarity used in the analysis, so that the previously described charge-dispersing effect by electrostatic repulsion also acts on the accumulated charges. Consequently, the charge-up is temporarily resolved or reduced. Based on this, whether or not the ion optical element in question is contaminated can be determined.

The mass spectrometer described in any of Clauses 2-4 can reliably locate an ion optical element which is likely to have charge-up, i.e. which is likely to be contaminated.

(Clause 5) The mass spectrometer described in any of Clauses 1-4 may further include a main ESI probe configured to ionize a component in an introduced first liquid sample by electrospray ionization, a standard sample supplier configured to supply a standard sample, and a sub ESI probe configured to ionize a component in the standard sample supplied from the standard sample supplier by electrospray ionization.

In the mass spectrometer described in Clause 5, the main ESI probe may be connected to the exit end of a column in a liquid chromatograph so that an eluate exiting from the column is introduced into the main ESI probe.

The mass spectrometer described in Clause 5 can ionize a standard sample by electrospray ionization and perform a mass spectrometric analysis on the standard sample, without requiring the removal of a tube extending from the column (or the like) connected to the main ESI probe or insertion of a switching valve (or the like) in the tube. Accordingly, the mass spectrometer described in Clause 5 does not require changing the tube connection or similar cumbersome tasks. After the completion of the device check using the standard sample, an analysis of a target sample can be performed without delay, which improves measurement efficiency.

REFERENCE SIGNS LIST

1 . . . Chamber
101 . . . Ionization Chamber
102 . . . First Intermediate Vacuum Chamber
103 . . . Second intermediate Vacuum Chamber
104 . . . Analysis Chamber
11 . . . Main ESI Probe
110 . . . Sub ESI Probe
12 . . . Heated Capillary
13 . . . Ion Lens
14 . . . Skimmer
15 . . . Multipole Ion Guide
16 . . . Aperture Electrode
17 . . . Pre-Quadrupole Mass Filter
18 . . . Main Quadrupole Mass Filter
19 . . . Ion Detector
2 . . . Liquid Chromatograph (LC) Unit
31-37 . . . Power Source
4 . . . Analysis Control Unit
41 . . . Device State Check Controller
42 . . . Charge-Up Check Controller
5 . . . Data Processing Unit
51 . . . Ion Intensity Data Acquirer
52 . . . Device State Determiner
53 . . . Charge-Up Determiner
6 . . . Control Unit
61 . . . Check Result Display Processor
7 . . . Input Unit
8 . . . Display Unit
9 . . . Power Switch
120 . . . Standard Sample Supply Unit
121 . . . Nitrogen Gas Supply Source
122 . . . Valve
123 . . . Sample Tank

The invention claimed is:

1. A mass spectrometer including a plurality of ion optical elements each of which is used for transporting ions or controlling the behavior of ions by an effect of an electric field, the mass spectrometer further comprising:

a device state determiner configured to perform, in response to a user instruction, or at a regular or irregular predetermined timing, an analysis on a predetermined sample, and to determine whether the mass spectrometer is in a normal state or abnormal state based on an ion intensity signal which is a result of the analysis;

a charge-up determiner configured to perform a charge-up check if it is determined by the device state determiner that the mass spectrometer is in an abnormal state, wherein the charge-up check includes determining whether or not charge-up is likely to be present in the plurality of ion optical elements and locating the charge-up if charge-up is likely to be present, based on a change in the ion intensity signal observed in the analysis performed on the predetermined sample while a process that an application voltage to one of the plurality of ion optical elements is changed to have a temporarily reversed polarity for a predetermined period of time is sequentially performed for each of the plurality of ion optical elements; and a notifier configured to notify a user of results of determination by the device state determiner and the charge-up determiner;

wherein the charge-up check comprises, as a judgment criterion, a change in the ion intensity signal between a first intensity obtained before the application voltage has the temporarily reversed polarity and a second intensity obtained after the application voltage has the temporarily reversed polarity.

2. The mass spectrometer according to claim 1, wherein the charge-up determiner comprises:

a controller configured to control the mass spectrometer so as to sequentially select each of two or more of the plurality of ion optical elements, and perform an operation for resolving charge-up on the selected ion optical element, after performing the analysis for a predetermined period of time; and a determination processor configured to determine a degree of contamination of each ion optical element under a control of the controller, based on a change in the ion intensity signal observed when the operation for resolving charge-up on the ion optical element was performed.

3. The mass spectrometer according to claim 2, wherein the operation for resolving charge-up on the selected ion optical element by the controller includes temporarily applying a direct-current voltage whose polarity is different from a polarity of a direct-current voltage applied to the selected ion optical element when the analysis is performed, or a direct-current voltage whose polarity is a same as a polarity of an ion to be analyzed.

4. The mass spectrometer according to claim 2, wherein the operation for resolving charge-up on the selected ion optical element by the controller includes generating, in an ion source, an ion whose polarity is different from a polarity used in the analysis, and driving each ion optical element so as to allow the ion to pass through the selected ion optical element and all ion optical elements located on an upstream side of an ion stream with respect to the selected ion optical element.

5. The mass spectrometer according to claim 1, further comprising a main ESI probe configured to ionize a component in an introduced first liquid sample by electrospray ionization, a standard sample supplier configured to supply a standard sample, and a sub ESI probe configured to ionize a component in the standard sample supplied from the standard sample supplier by electrospray ionization.

6. The mass spectrometer according to claim 2, further comprising a main ESI probe configured to ionize a component in an introduced first liquid sample by electrospray ionization, a standard sample supplier configured to supply a standard sample, and a sub ESI probe configured to ionize a component in the standard sample supplied from the standard sample supplier by electrospray ionization.

7. The mass spectrometer according to claim 3, further comprising a main ESI probe configured to ionize a component in an introduced first liquid sample by electrospray ionization, a standard sample supplier configured to supply a standard sample, and a sub ESI probe configured to ionize a component in the standard sample supplied from the standard sample supplier by electrospray ionization.

8. The mass spectrometer according to claim 4, further comprising a main ESI probe configured to ionize a component in an introduced first liquid sample by electrospray ionization, a standard sample supplier configured to supply a standard sample, and a sub ESI probe configured to ionize a component in the standard sample supplied from the standard sample supplier by electrospray ionization.

* * * * *